US012477992B2

(12) United States Patent
Lott

(10) Patent No.: US 12,477,992 B2
(45) Date of Patent: Nov. 25, 2025

(54) TOWED AGRICULTURAL APPARATUS HAVING SUPPORT ARM FOR CONTROLLING MOVEMENT OF WORKING IMPLEMENT OF THE AGRICULTURAL APPARATUS

(71) Applicant: AGCO International GmbH, Neuhausen (CH)

(72) Inventor: Oliver Gerhard Lott, Feucht (DE)

(73) Assignee: AGCO International GmbH, Neuhausen (CH)

( * ) Notice: Subject to any disclaimer, the term of this patent is extended or adjusted under 35 U.S.C. 154(b) by 759 days.

(21) Appl. No.: 17/805,882

(22) Filed: Jun. 8, 2022

(65) Prior Publication Data

US 2022/0386520 A1    Dec. 8, 2022

(30) Foreign Application Priority Data

Jun. 8, 2021 (GB) .................................... 2108163

(51) Int. Cl.
*A01D 78/10* (2006.01)
*A01B 73/04* (2006.01)

(52) U.S. Cl.
CPC ..... *A01D 78/1014* (2013.01); *A01D 78/1028* (2013.01); *A01B 73/044* (2013.01); *A01D 78/1078* (2013.01)

(58) Field of Classification Search
CPC ............ A01D 78/1007; A01D 78/1028; A01D 78/1014; A01D 78/1078; A01B 73/044
See application file for complete search history.

(56) References Cited

U.S. PATENT DOCUMENTS

| 4,030,551 A * | 6/1977 | Boetto | A01B 73/044 91/170 R |
| 4,046,203 A * | 9/1977 | Ward | A01B 73/044 172/657 |
| 4,151,886 A * | 5/1979 | Boetto | A01B 73/02 172/311 |

(Continued)

FOREIGN PATENT DOCUMENTS

EP            3725150 A1       10/2020

OTHER PUBLICATIONS

UK Intellectual Property Office, Search report for UK priority Application No. GB2108163.3, dated Mar. 11, 2022.

*Primary Examiner* — Joseph M Rocca
*Assistant Examiner* — Julia C Tran

(57) ABSTRACT

An implement having a frame for towing by an agricultural vehicle, a lifting arm pivotally connected toward a first end of the frame, a support arm pivotally connected at a first end to a second end of the arm, a working implement carried from a second end of the support arm, a support located between a first end of the lifting arm and the frame which has a working surface. The support element includes a main body with connected first and second support surfaces, a third support surface spaced from the first support surface, a first displaceable element with a contact surface and an opposed support surface, and located between the first and third support surfaces, and a second displaceable element with a first contact surface and an opposed support surface, and located between the second support surface and the third support surface.

8 Claims, 8 Drawing Sheets

(56) References Cited

U.S. PATENT DOCUMENTS

| | | | | | |
|---|---|---|---|---|---|
| 4,316,511 | A | * | 2/1982 | Andersen | A01B 73/044 |
| | | | | | 172/776 |
| 4,723,404 | A | * | 2/1988 | Aron | A01D 78/1014 |
| | | | | | 56/370 |
| 2020/0077565 | A1 | * | 3/2020 | Gembler | A01D 78/1014 |
| 2021/0120744 | A1 | * | 4/2021 | Fillep | A01D 78/10 |

* cited by examiner

TOWED AGRICULTURAL APPARATUS HAVING SUPPORT ARM FOR CONTROLLING MOVEMENT OF WORKING IMPLEMENT OF THE AGRICULTURAL APPARATUS

FIELD OF THE INVENTION

The present invention relates to a towed agricultural apparatus and in particular to a towed apparatus in the form of a rake.

BACKGROUND

In operation, a rake provided with rotors is towed behind an agricultural vehicle and used to collect cut crop, such as hay or straw into swaths or windrows for subsequent processing, for example for collection by a baler or loader wagon, or for subsequent spreading of the swath or windrow by a tedder. The rotors are typically mounted on arms connected to central frame of the rake.

During operation of the rake while towed across a field of cut crop, the rotors adopt a lowered position (the "working position"), when the rake is turned in a headland position the rotors are raised a little (the "headland position") and when the rake is to be transported to and away from the field the rotors are completely raised or folded in (the "transport position"). A lifting cylinder is operated to raise an arm carrying the rotor from the working position to the headland position. A support is provided to stop further raising of the rotor in the headland position. The rotor can then be lowered again in preparation for the rake being redirected across the cut crop. If the rotor is to be moved into the transport position, the functionality of the support must be prevented. This is typically achieved with the help of a pull rope attached to the support. When this rope is tightened, the support is raised, so that the rotor cannot be held in the headland position during raising, but instead can move into the transport position. The rope limits the user-friendliness of the machine, especially since the operator often has to apply a high tensile force.

SUMMARY OF THE INVENTION

According to a first aspect of the present invention, a towed agricultural implement comprises a frame for towing by an agricultural vehicle, a lifting arm pivotally connected toward a first end to the frame, a support arm pivotally connected at a first end to a second end of the lifting arm, and a working implement carried from a second end of the support arm in which a support element is located between a first end of the lifting arm and the frame characterised in that the frame further comprises a working surface and in that the support element comprises a main body portion having a first support surface, a second support surface connected to the first support surface, and a third support surface spaced from the first support surface, a first displaceable element having a contact surface and an opposed support surface, the first displaceable element being located between the first and third support surfaces, and a second displaceable element having a first contact surface and an opposed support surface, the second displaceable element being located between the second support surface and the third support surface.

Preferably the first and third support surfaces are provided in planes extending substantially parallel to one another.

Preferably the support element further comprises a fourth support surface, spaced from the first and third support surfaces.

Preferably the first, third and fourth support surfaces are provided in planes extending substantially parallel to one another.

Preferably the support element comprises an elongate main body portion with an end portion in which the first and second fixed operating surfaces are provided on a lower surface of the elongate main body and the fourth fixed operating surface is provided on a lower surface of the end portion.

Preferably the support element further comprises a bridge portion, separated from the main body portion of the support element by a bracket, a lower surface of the bridge portion being provided with the third support surface.

Preferably, the first displaceable element is connected at a first end for pivoting movement at a first end of the bridge portion. More preferably, the first displaceable element is biased such that a second end of the first displaceable element abuts the first support surface.

Preferably, the end portion of the support element is provided with first and second ends, and the second displaceable element is connected for pivoting movement at a first end to a first end of the end portion. More preferably, the second displaceable element is biased such that a second end of the second displaceable element abuts a second end of the bridge portion.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
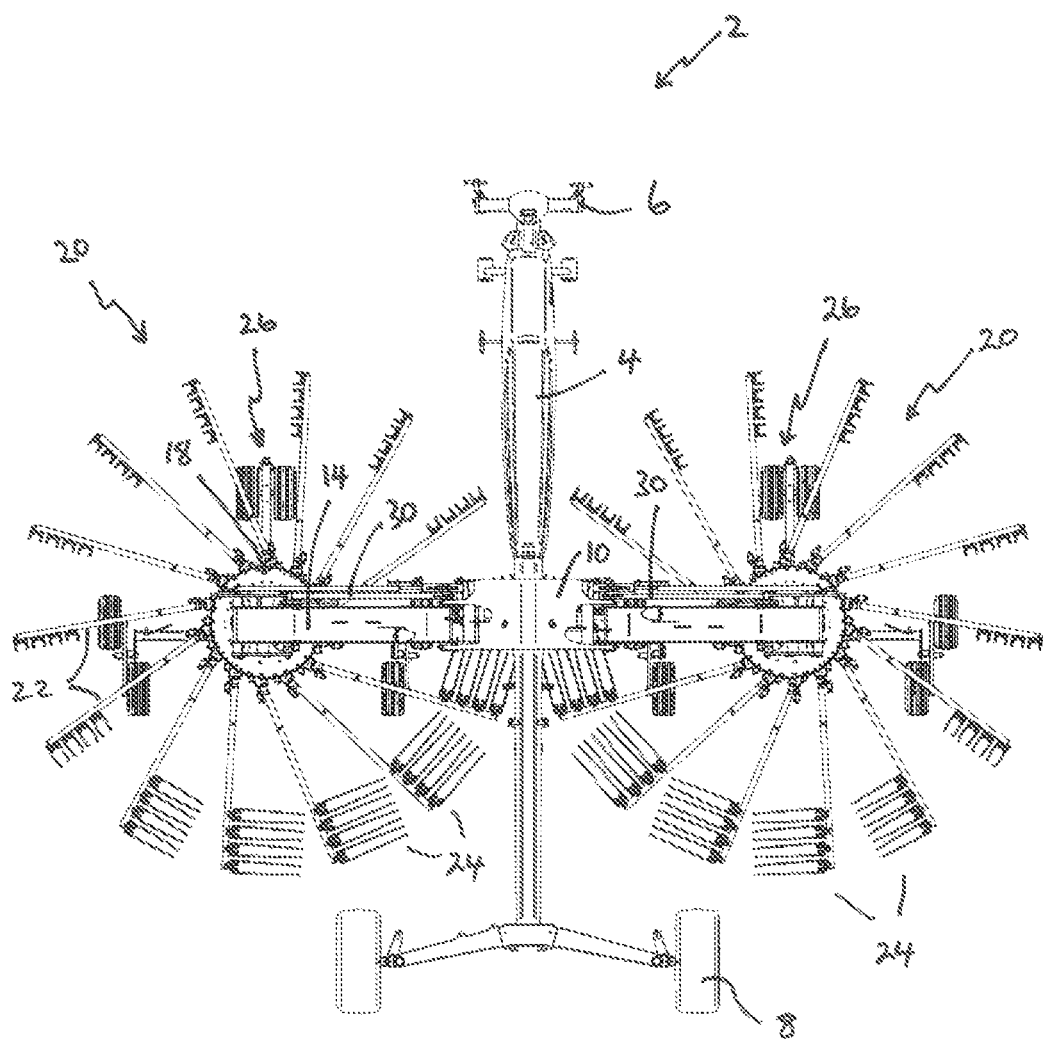
FIG. 1 shows a plan view of a rake in accordance with the present invention

With reference to the Figures, a towed agricultural implement 2 suitable for raking cut crop into swaths or windrows is shown. As can most clearly be seen from FIG. 1, the towed agricultural implement 2 comprises a support frame 4 a first end of which is adapted for connection to a towing vehicle by way of a hitch arrangement 6. A second end of the support frame 4 is provided with ground engaging wheels 8 to support the towed agricultural implement 2 as it is being towed. In a middle region the support frame 4 is provided with a support portion 10.

It will be understood that the towed agricultural implement 2 is substantially symmetrical about the central support frame 4 and accordingly only one side of the towed agricultural implement will be described in detail, the other side being understood to correspond.

The support portion 10 of the towed agricultural implement 2 is provided to each side with a displaceable arm 12 moveable between a working position and a transport position. Each arm 12 is in two parts comprising a main portion 14 and a depending portion 16. The main portion 14 extends between a pivot mounting on the support portion 10 at a first end and a first end of the depending portion 16 at a second end. A second end of the depending portion 16 is connected to a central hub 18 of a rotary rake 20. The main portion 14 is further connected to the support portion 10 by way of a first displacement apparatus 28 mounted between the support portion 10 of the support frame 4 and the main portion 14 of the arm 12 to control pivoting movement of the main portion 14 of the arm 12 about the pivot mounting on the support portion 10 (best seen in FIG. 3). The first displacement apparatus 28 may take any form, for example a hydraulic actuator. Using the first displacement apparatus 28, the arm 12 may be controlled to adopt a working position in which the rotary rake moves the cut crop into swaths or windrows, a transport position or an intermediate headland position.

The central hub 18 of the rotary rake 20 carries a plurality of time arms 22 provided with sets of tines 24 depending from a distal end of each of the time arms. The tine arms 22 are arranged to travel along a cam path such that the sets of tines 24 are adapted to be raised and lowered as the tine arms 22 rotate around the central hub 18 during towing of the agricultural implement 2. The central hub 18 is further provided with a ground engaging wheel arrangement 26 to support the rake rotor in the working position. It will be appreciated that the wheel arrangement 26 will no longer be ground engaging when the rotary rake 20 is in the headland position or in the transport position.

A suitable second displacement apparatus 30 (FIG. 1) is located between the support portion 10 of the support frame 4 and an extension 32 extending upward from the first end of the depending portion 16. This allows controlled displacement of the rotary rake 20 away from the support frame 4 as required.

Figure 3:
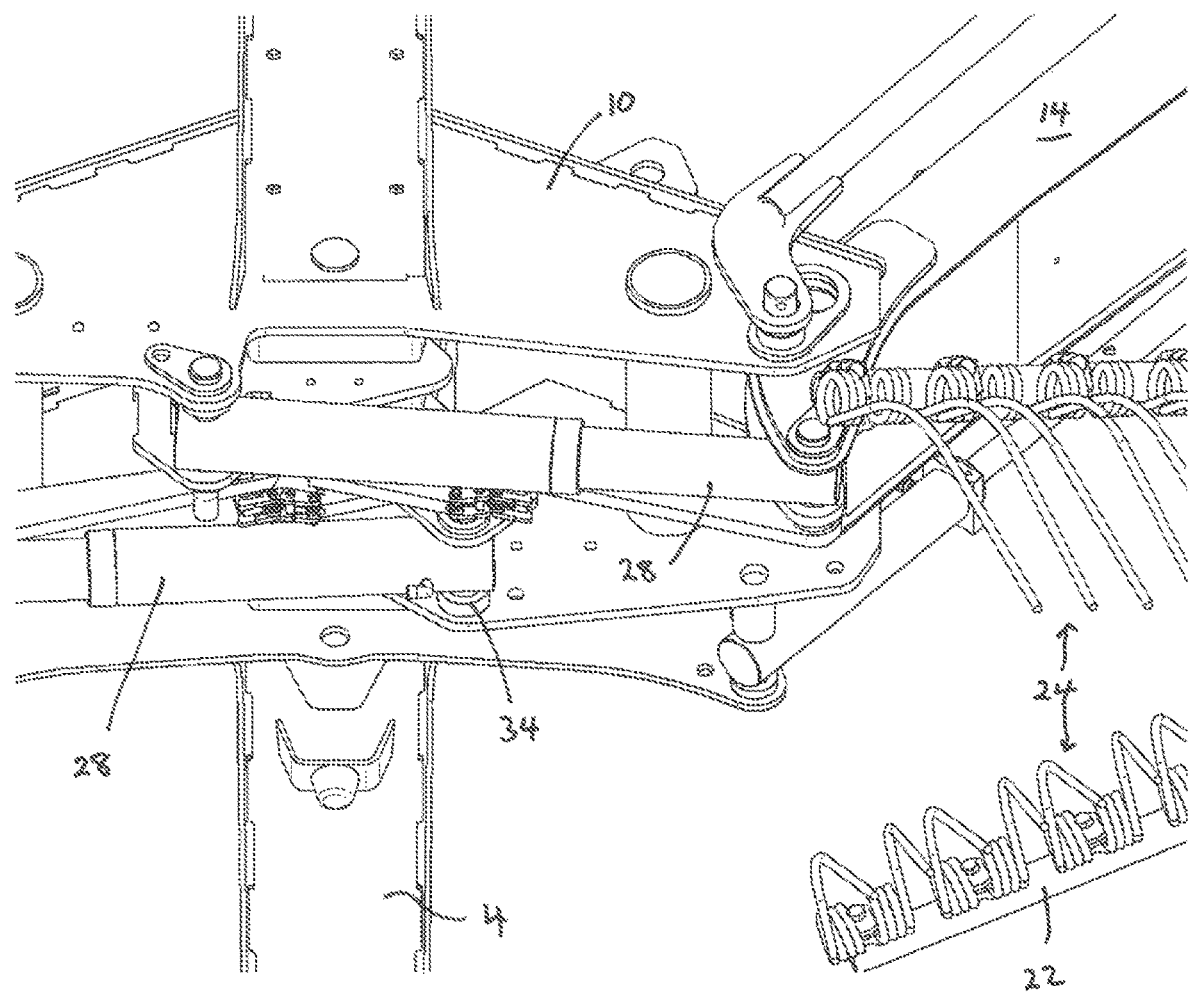
FIG. 3 shows a perspective view of a portion of the underside of the rake of FIG. 1.

A pin 34 is mounted on the support portion 10. The pin 34 conveniently may also serve as a mounting pin for one end of the first displacement apparatus 28 operating the displaceable arm 12 to the other side of the support frame 4 (FIG. 3). An extension at one end of the pin 34 is arranged between a main portion 10 of the displaceable arm 12 and the central frame 4 to control the movement of the displaceable arm 12.

Figure 4:
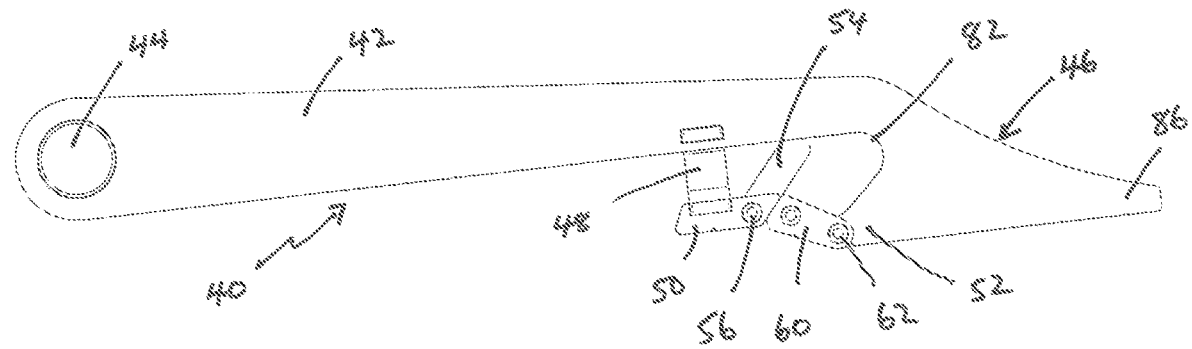
FIG. 4 shows a side view of a support element for use in the present invention.
Figure 5:
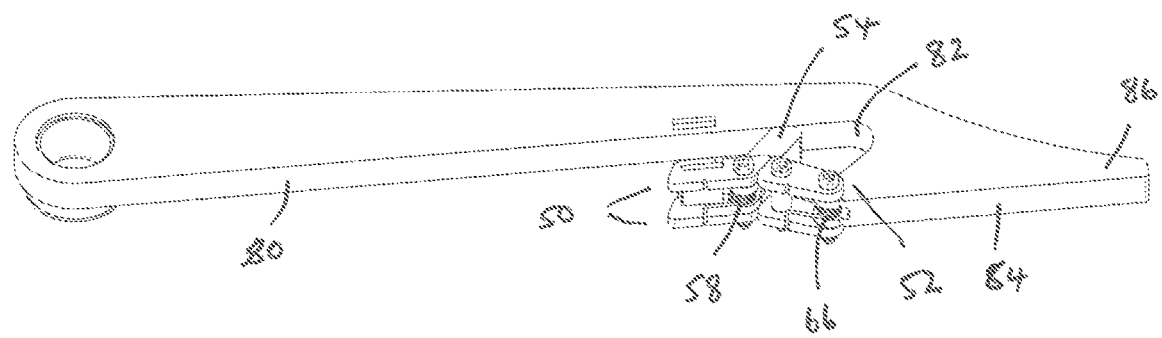
FIG. 5 shows a first perspective view of the support element of FIG. 4.
Figure 6:
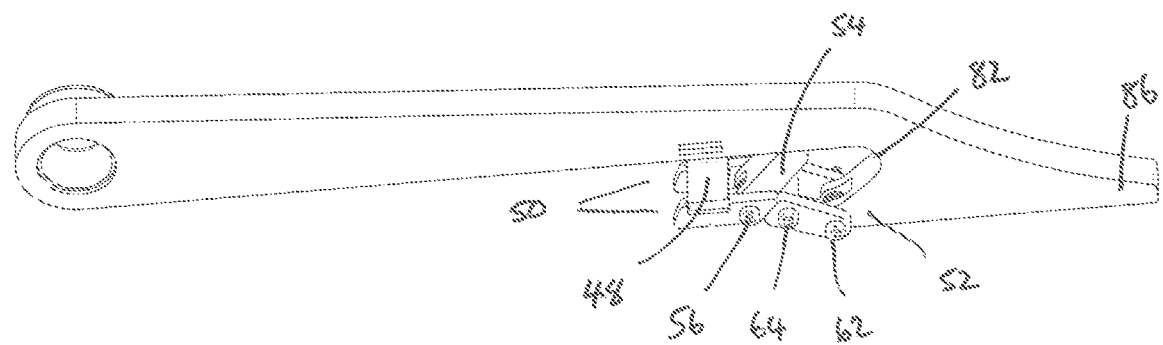
FIG. 6 shows a second perspective view of the support element of FIG. 4.

The construction of the support element is shown in more detail in FIGS. 4 to 6. The support element 40 comprises a generally elongate main body portion 42 provided with a circular opening 44 at a first end. The second end is provided with a generally triangular foot 46 depending from a second end of the main body portion 42.

A bracket 48 is provided towards the second end of the main body portion 42. An upper portion of the bracket 48 is secured to the support element 40 in any suitable manner. In the embodiment of FIGS. 4 to 13, the upper portion of bracket 48 extends through an opening in the support element 40 and welded into place.

The bracket 48 supports a bridge segment of two parallel elements 50. The parallel elements 50 are each carried at a first end from the bracket 48 and each provided towards a second end with aligned circular openings. The parallel elements 50 are connected to the bracket 48 in any suitable manner. The parallel elements 50 are parallel with one another and also in alignment with the main body portion 42 of the support element 40 from which they are supported by the bracket 48. The second ends of the parallel elements 50 are spaced from a first adjacent corner 52 of the triangular foot 46. An inner arcuate surface 82 is provided between the main body portion 42 and the first corner 52 of the triangular foot 46.

A first finger element 54 is supported between the parallel elements 50. A first end of the first finger element 54 is provided with a circular opening. A pin 56 extends though the openings in the parallel elements 50 and the opening in the first finger element 54 allowing relative movement between the first finger element 54 and the parallel elements 50 about the pin 56. A spring element 58, conveniently a torsion spring, is provided between the parallel elements 50 and the first finger element 54 such that a second end of the first finger element is biased towards contact with the main body portion 42 of the support element 40. Conveniently the spring element 58 is located about the pin 56 within a cut away portion of the first end of the first finger element 54. In the biased position, it can be seen that the lower surfaces of the first finger element 54 are aligned with sloping end faces provided at the second ends of the parallel elements 50.

A second finger element 60 is supported from the first corner 52 of the triangular foot 46 of the support element 40. In the illustrated embodiment, the second finger element 60 comprises a pair of parallel elements. Each of a first and second ends of each the parallel elements are provided with parallel openings. A pin 62 extends though the openings in the first ends of the parallel elements of the second finger element and the opening in the first corner 52 of the triangular foot 46 allowing relative movement about the pin 62 between the second finger element 60 and the first corner 52 of the triangular foot 46. A pin 64 extends between the openings in the second ends of the parallel elements of the second finger element to keep the parallel elements of the second finger element 60 aligned. Preferably the pin 64 also carries a spacer to hold the parallel elements of the second finger element 60 at the desired separation.

Biasing means in the form of a spring element 66, conveniently a torsion spring, are provided between the second finger element 60 and the first corner 52 of the triangular foot 46 such that a second end of the first finger element is biased towards contact with the second ends of the parallel elements 50 of the bridge segment. In the illustrated embodiment, a cut away channel is provided in the first corner 52 of the triangular foot 46 such that the spring element is wrapped around a central portion of the pin 62.

The second ends of the parallel elements of the finger element 60 are provided with sloping end faces for abutment with the sloping end faces of the parallel elements 50 of the bridge segment when the finger element 60 is in the biased position and prevents further movement of the second finger element 60 by the spring element 66 (as shown in FIGS. 4 to 7).

The extension at one end of the pin 34 is provided with a working surface 70. The working surface 70 may take any suitable form, most conveniently a circular shape.

Figure 2:
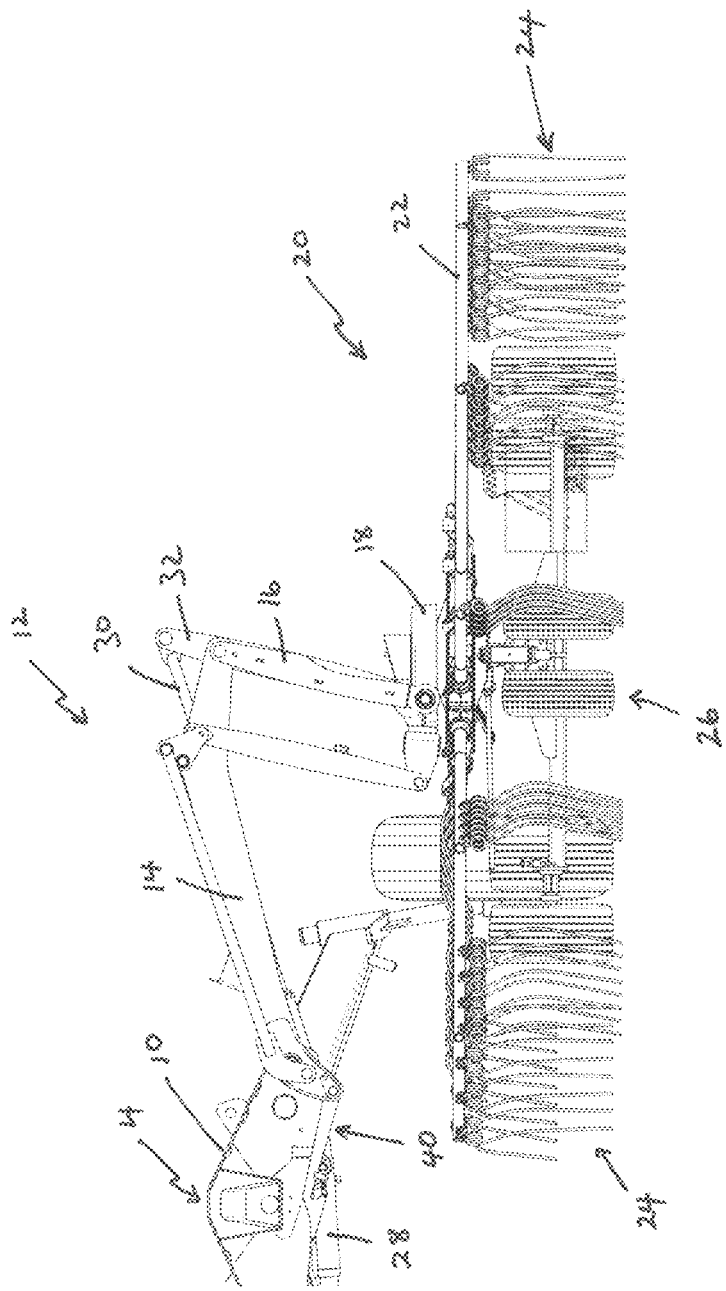
FIG. 2 shows an sectional view along a central portion of the rake towards a wheel support portion of the rake showing one side of the rake of FIG. 1.
Figure 7:
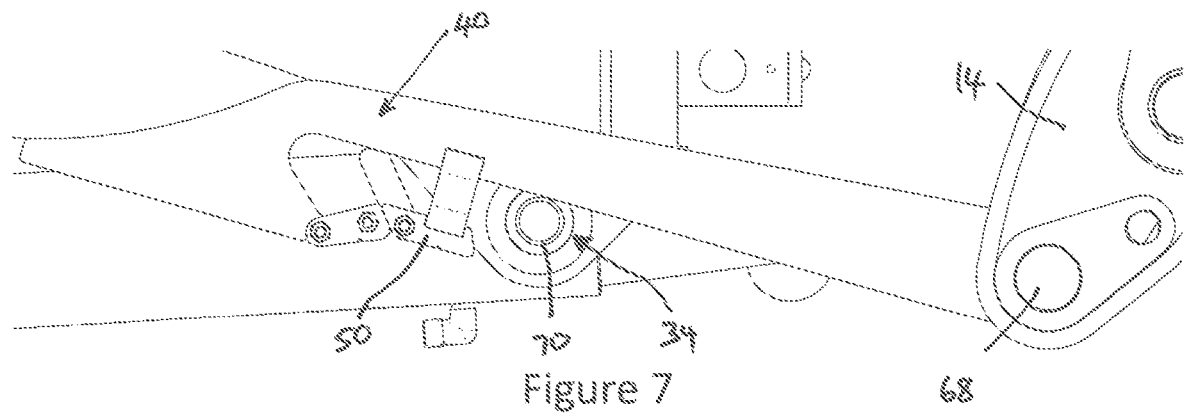
FIG. 7 shows a schematic side view of the apparatus in a working position of the rake.

As may be seen from FIG. 2 and in more detail in FIGS. 7 to 15, the first end of the support element 40 is connected to a first end of the displaceable arm 12 by way of a pivot pin 68 extending through the opening 44 in the first end of the support element 40. In the position of FIGS. 2 and 7, corresponding to the working position of the rake 2, a lower surface 80 of the main body portion 42 of the support element 40 rests on an upper part of the working surface 70. In this way, the lower surface 80 of the main body portion 42 of the support element 40 acts as a support surface by which the support element 40 is supported on the working surface 70.

Figure 8:
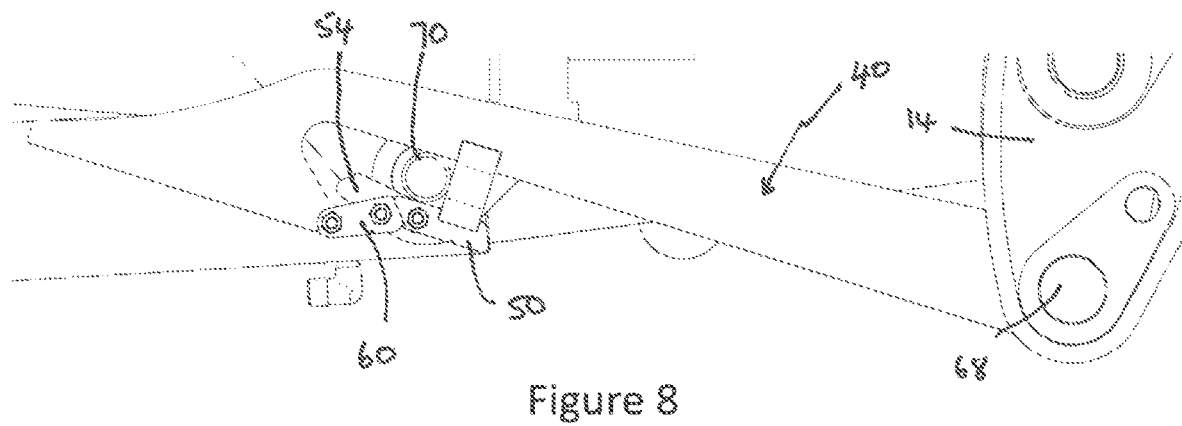
FIG. 8 shows a view similar to that of FIG. 7, with the apparatus between the working position and a headland position.
Figure 9:
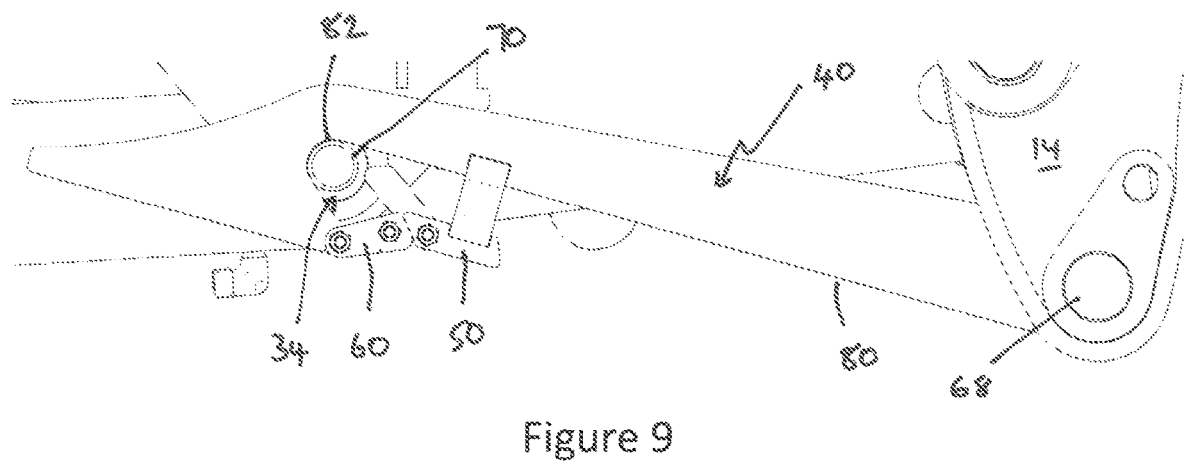
FIG. 9 shows a view similar to that of FIG. 8 with the apparatus in the headland position.

As the rake 2 is moved between the working position and the headland position, the support element 40 is drawn along the working surface 70 such that the work surface 70 passes between upper surfaces of the parallel elements 50 of the bridge segment and the lower surface 80 of the main body portion 42 towards the inner arcuate surface 82. In doing so, a first side of the first finger element 54 is contacted by the working surface 70 such that the first finger element 54 is pivotally displaced, and the second end of the first finger element 54 is moved away from the lower surface 80 of the main body portion (FIG. 8).

Location of the working surface 70 within the arcuate surface 82 (FIG. 9) corresponds to the headland position of the rake. As can be seen from FIG. 9, movement of the support element 40 into this position has allowed the first finger element 54 to spring back such that the second end of the first finger element 54 is once again in contact with the lower surface 80 of the main body portion 42 of the support element 40. A second side of the first finger element 54 now serves as a support surface for the working surface 70 to prevent the support element 40 from moving back along the working surface 70 along the lower surface 80.

Figure 10:
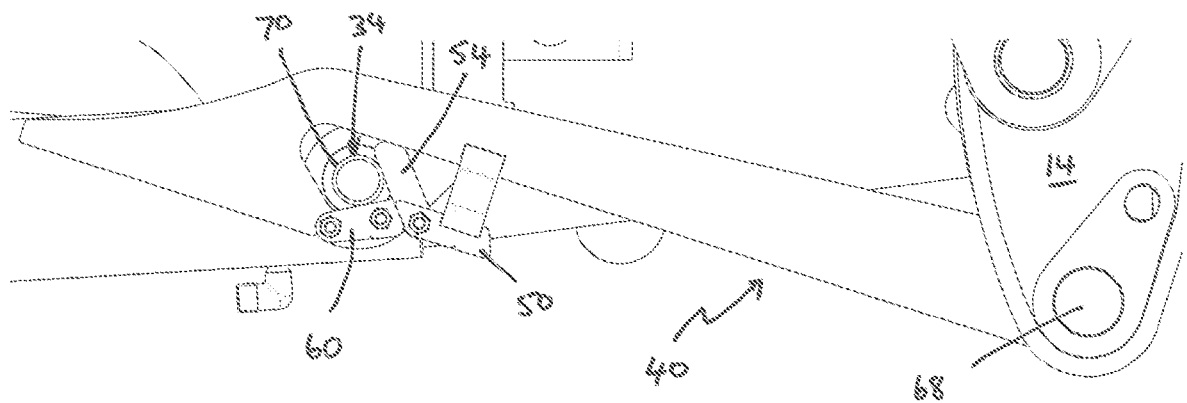
FIG. 10 shows a view similar to that of FIG. 9 with the apparatus partially moved from the headland position back towards the working position.
Figure 11:
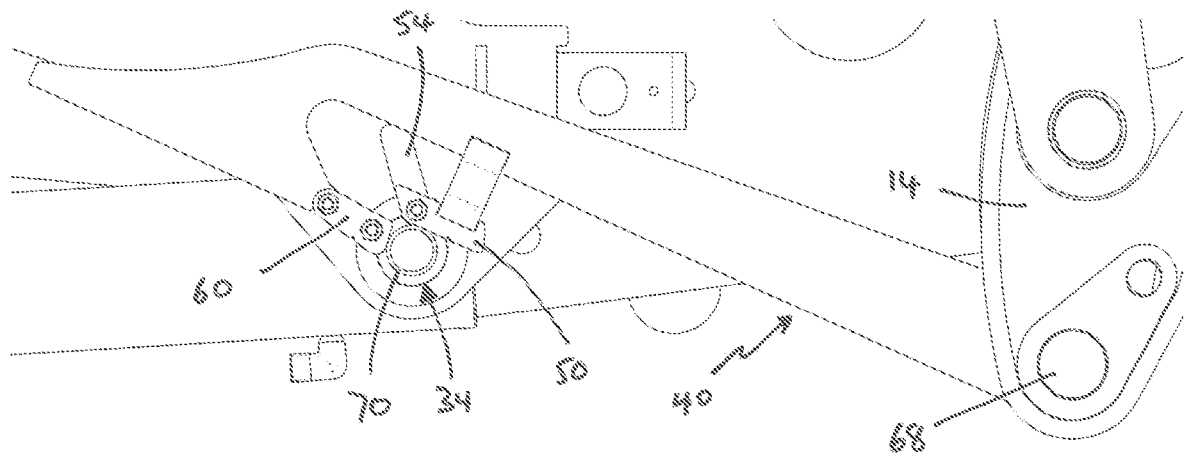
FIG. 11 shows a view similar to that of FIG. 10 with the apparatus further progressed toward the working position.
Figure 12:
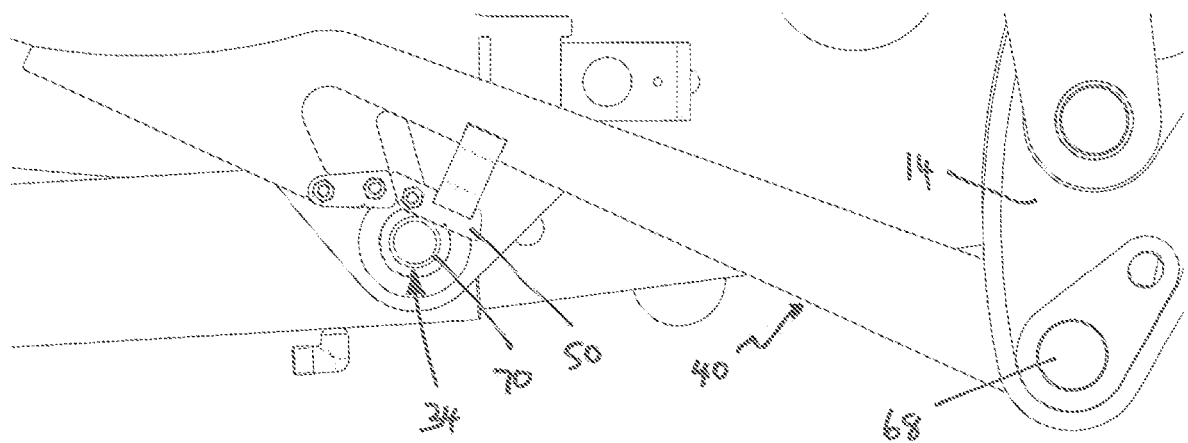
FIG. 12 shows a view similar to that of FIG. 11 with the apparatus still further progressed toward the working position.
Figure 13:
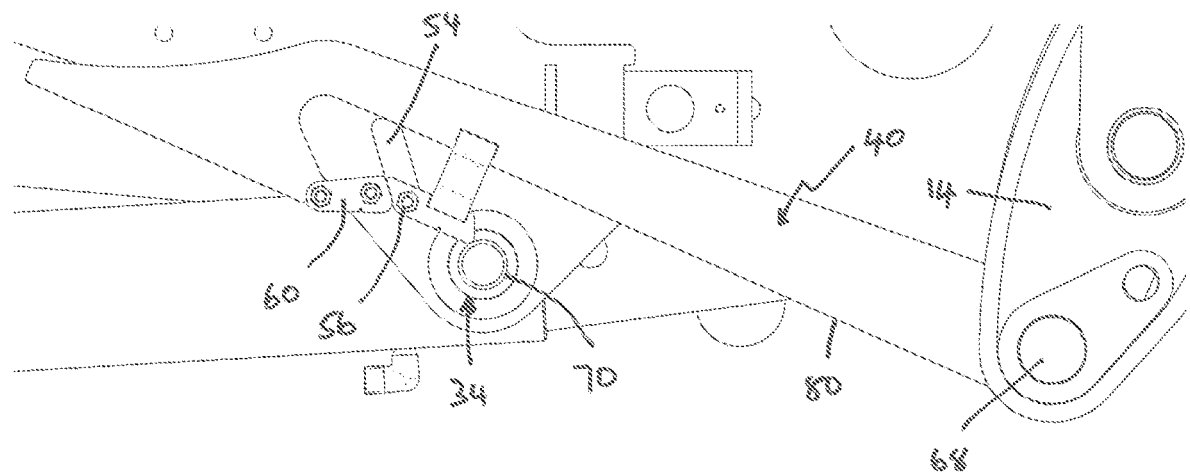
FIG. 13 shows a view similar to that of FIG. 12 with the apparatus about to return to the working position.
Figure 14:
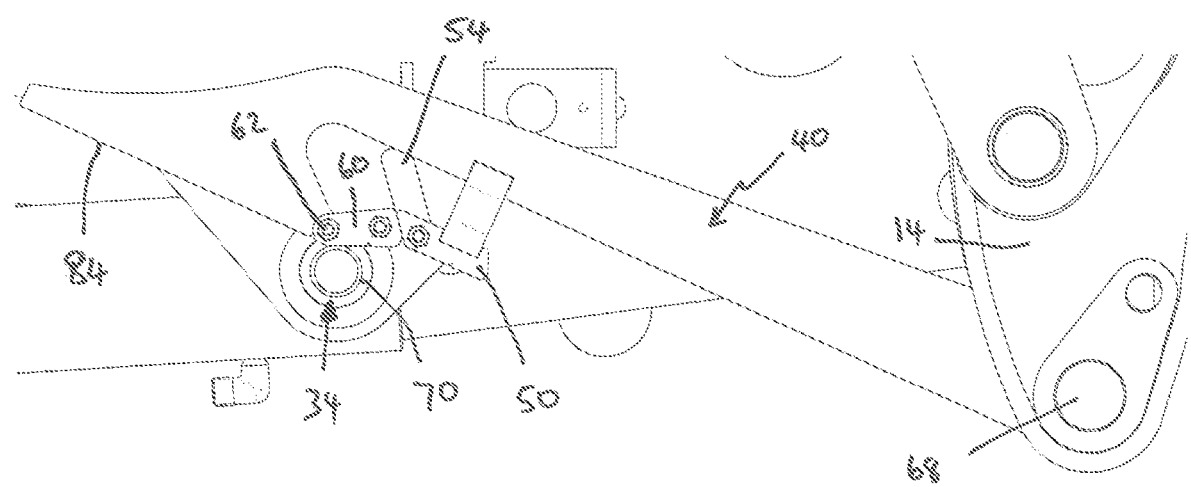
FIG. 14 shows a view similar to FIG. 12 with the apparatus being moved to the transport position.
Figure 15:
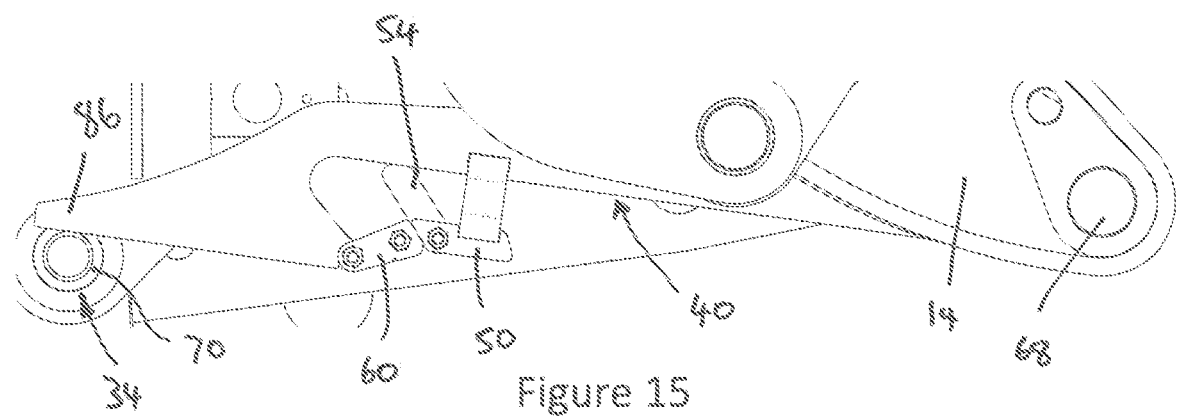
FIG. 15 shows a view similar to that of FIG. 14 with the apparatus in the transport position.
Figure 16:
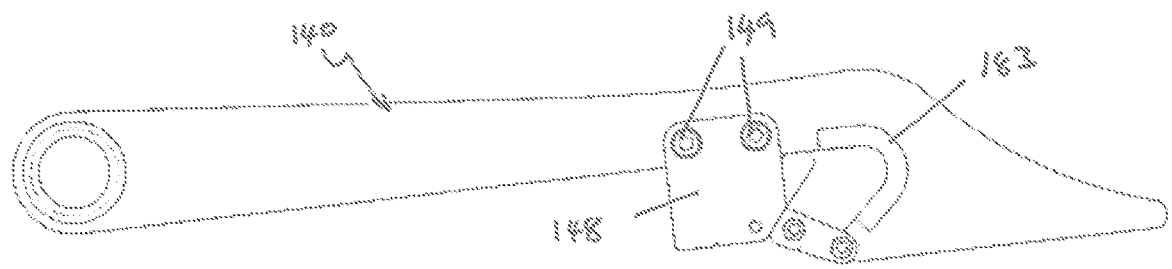
FIG. 16 shows a first side view of a first side of a second embodiment of a support element for use in the present invention.
Figure 17:
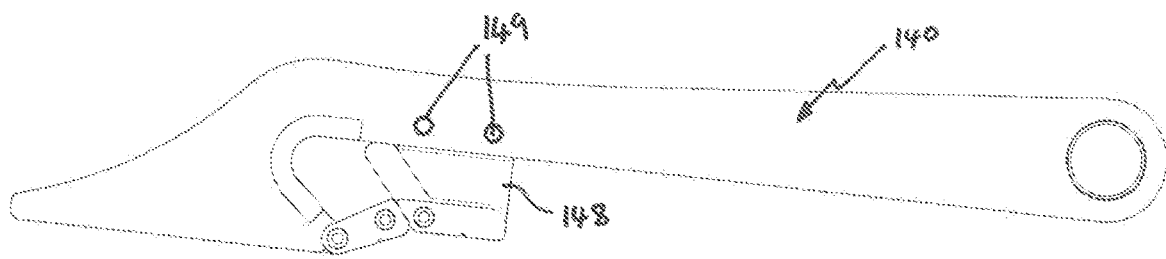
FIG. 17 shows a second side view of a second side of the support element of FIG. 16.
Figure 18:
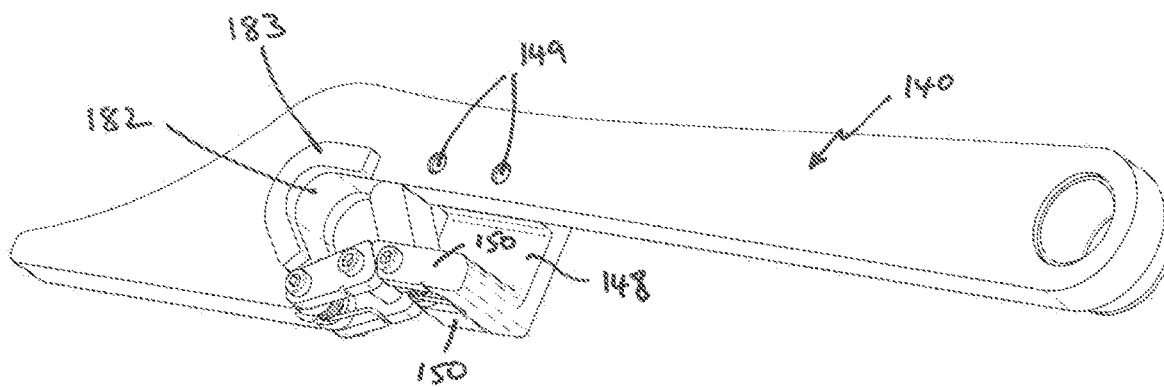
FIG. 18 shows a perspective view of the second side of the support element of FIG. 16.
Figure 19:
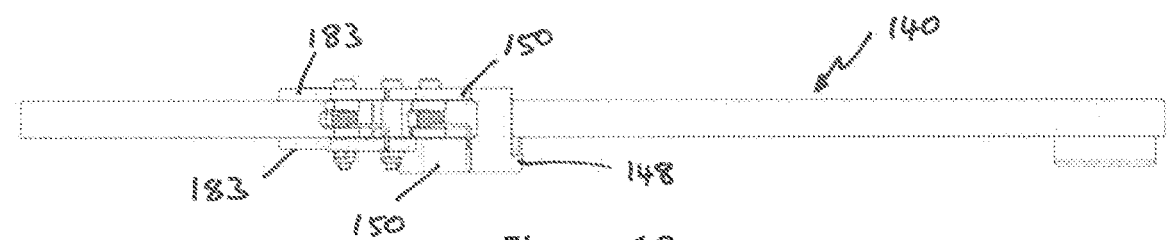
FIG. 19 shows a view from below of the support element of FIG. 16.

In order to return to the working position of the rake, the displaceable arm 12 is lowered and the support element 40 pushed away from the working surface 70. As the second side of the first finger element 54 bars the way, the support element 40 is urged along the first finger element 54 and into contact with a first side of the second finger element 60 (FIG. 10). The upper surfaces of the second finger element 60 are then pushed by the working surface 70 and the second finger element 60 is displaced about the pivot pin 56 allowing the lower surfaces of the parallel elements 50 of the bridge segment to pass over and support the support element 40 on the upper part of the working surface (FIG. 11). Once the second finger element 60 is clear of the working surface 70, the second finger element 60 springs back into position (FIG. 12). Once the lower surfaces of the parallel elements 50 of the bridge segment have cleared the working surface 70, the support element 40 drops such that the lower surface 80 of the support element 40 once again rests on the upper part of the working surface 70 (FIG. 7).

In order to move the rake from the working position to the transport position, the same initial movement is followed as when raising the displaceable arm 12 to the headland position. A similar initial lowering of the displaceable arm 12 is then followed to free the working surface 70 from between the first and second finger elements 54,60 and the arcuate surface 82 of the main body portion 42. Before the support element 40 drops onto the upper part of the working surface 70 (eg FIG. 13) the displaceable arm 12 is once again raised by operation of the first actuator 30.

This draws the support element 40 further over the working surface 70, such that a the lower surfaces of the parallel elements 50 of the bridge segment and then the lower surfaces of the parallel elements of the second finger are drawn over the upper part of the working surface 70 (FIG. 14) to support the support element 40 on upper part of the working surface 70. Abutment of the end surfaces of the second finger element 60 with the sloping end surface of the bridge segment allows the lower surfaces of the second finger element 60 to serve as support surfaces for the working surface 70. As the lifting arm is further raised into the transport position, a lower surface 84 of the foot 46 of the support element 40 is pushed over the working surface 70, until in the transport position, a second corner 86 of the foot 46 of the support element 40 is resting on an upper part of the working surface 70 (FIG. 15) to support the support element 40 on upper part of the working surface 70.

When the displaceable arm 12 is lowered from the transport position to the working position, the support element 40 is pushed along the upper part of the working surface 70 until a lower surface of the support element 40 is once again in contact with the upper part of the working surface 70.

The use of such a support element 40 has as an advantage that the need for the pull rope is eliminated.

A scale may be provided the lifting arm to indicate to an operator the functional range of the apparatus.

A second embodiment of the support element is shown in FIGS. 16 to 19. Like parts have been given like reference numerals. As can be seen the bridge segment is of different construction to that of the first embodiment of the support element. In the embodiment of FIGS. 16 to 19 an upper end of the bracket 148 is connected to the support element 140 by way of fasteners 149 extending through the upper end of the bracket 148 and into the support element 140. The parallel elements 150 are formed as a unitary part of a lower portion of the bracket 148.

The arcuate surface 182 is extended to each side of the support element 140 by the provision of reinforcing members 183 to each side of the support element 140.

It will be understood that the second embodiment of the support element 140 nevertheless operates within the agricultural implement in the same way as the first embodiment.

From reading the present disclosure, other modifications will be apparent to persons skilled in the art. Such modifications may involve other features which are already known in the field of rakes and component parts therefore and which may be used instead of or in addition to features already described herein.

The invention claimed is:

1. A towed agricultural implement comprising a frame for towing by an agricultural vehicle, a displaceable arm pivotally connected toward a first end to the frame, a depending portion pivotally connected at a first end of the depending portion to a second end of the displaceable arm, and a working implement carried from a second end of the depending portion in which a support element is located between the first end of the displaceable arm and the frame to control movement of the working implement between a working position and a transport position by way of a headland position, the frame comprising a working surface, wherein the support element comprises:

an elongate main body portion with an end portion, the main body portion comprising a lower surface and an inner arcuate surface connected to the lower surface of the main body portion, a bridge segment separated from the main body portion by a bracket, wherein the bridge segment has two parallel elements supported from the lower surface of the main body portion, each of the parallel elements having a lower surface spaced from the lower surface of the main body portion;

a first displaceable finger element comprising a contact surface and an opposed support surface, wherein the first displaceable finger element is located between the lower surface of main body portion and the lower surfaces of the parallel elements; and a second displaceable finger element comprising a first contact surface and an opposed support surface, wherein the second displaceable finger element is located between the inner arcuate surface and the lower surfaces of the parallel elements;

wherein movement of the working surface along the lower surface of the main body portion, the inner arcuate surface, and the lower surfaces of the parallel elements controls movement of the working implement between the working position and the headland position.

2. The towed agricultural implement according to claim 1, wherein the lower surface of the main body portion and the lower surfaces of the parallel elements are in planes extending substantially parallel to one another.

3. The towed agricultural implement according to claim 1, wherein the support element further comprises a foot having a lower surface spaced from the lower surface of the main body portion and the lower surfaces of the parallel elements, wherein movement of the working surface along the lower surface of the main body portion, the inner arcuate surface, the lower surfaces of the parallel elements, and the lower surface of the foot controls movement of the working implement between the working position and the transport position.

4. The towed agricultural implement according to claim 3, wherein the lower surface of the main body portion,the lower surfaces of the parallel elements, and the lower surface of the foot are in planes extending substantially parallel to one another.

5. The towed agricultural implement according to claim 1, wherein the first displaceable finger element is connected at a first end for pivoting movement at a first end of the bridge segment.

6. The towed agricultural implement according to claim 5, wherein the first displaceable finger element is biased such that a second end of the first displaceable finger element abuts the lower surface of the main body portion.

7. The towed agricultural implement according to claim 1, wherein a foot of the support element is provided with first and second ends, and the second displaceable finger element is connected for pivoting movement at a first end to the first end of the foot.

8. The towed agricultural implement according to claim 7, wherein the second displaceable finger element is biased such that a second end of the second displaceable finger element abuts a first end of the bridge portion segment.

* * * * *